Patented Apr. 18, 1944

2,347,031

UNITED STATES PATENT OFFICE 2,347,031

AIR FILTER

Martin Eli Cupery, Wilmington, Del., assignor to E. I. du Pont de Nemours & Company, Wilmington, Del., a corporation of Delaware No Drawing. Application June 7, 1940, Serial No. 339,331

7 Claims. (Cl. 183—45)

This invention relates to air conditioning and is particularly directed to dust collecting compositions containing an ammonium salt of an acid ester of a polybasic inorganic oxyacid and a polyhydroxy aliphatic compound.

In air conditioning it is common to employ a fluid type air filter consisting in a porous barrier, placed across the air stream, in which, because relatively large pores are employed so as not substantially to hinder the passage of air therethru, there is included a suitable viscous liquid which serves to catch, wet and retain the dust particles in the filter. Heretofore it has been more customary to employ highly refined mineral oils as the dust collecting medium in such filters, and the filters so produced have suffered in consequence of the undesirable characteristics of such oils. Thus, filters so constructed constitute a fire hazard even when oils having high flash points are used, not only because the dust-laden oils are susceptible to spontaneous combustion but also because when a fire breaks out combustible fumes are discharged in the ventilating system so that the fire spreads more readily than otherwise. Furthermore, such filters rapidly become dust laden and must either be discarded or cleaned, and the only suitable method available is the relatively expensive dry cleaning. It has been suggested to avoid certain of these defects by substituting very high flash point liquids such as tricresyl phosphate, but such materials are somewhat objectionable because of odor and particularly in case of local fires, since then the odor permeates thruout the ventilating system.

I have now found that the disadvantages of the prior art are avoided by using as the collecting media for air-borne dust the non-crystalline fluid salts of the acid esters of polybasic inorganic oxyacids and polyhydroxy aliphatic compounds. Especially I have found the ammonium salts, such as the ammonium phosphates, ammonium borates, and ammonium sulfates, of polyhydroxy aliphatic compounds to be of value for this purpose, since with the ammonium salts I not only avoid the disadvantages of the prior art compounds but also obtain a further and important advantage attributable to the flame-resisting action of the ammonium salts.

In carrying out my invention dust filters of conventional design are treated to impregnate the pores of the dust filter with dust collecting compositions prepared according to my invention. When I speak of pores of dust filters I use the term loosely with reference to the various types of interstices which exist in the various types of filters. These structures may be fabricated, for example, by felting or matting fibrous materials such as fiber glass, waste, hair, excelsior or metal turnings in suitable supporting structures, or by depositing porous material such as wood flour on metal wire screens. Corrugated paper or successive layers of fabric can also be used. In all these cases an adhesive, such as latex, can be applied permanently to bind the structure into a unit.

The dust collecting liquids of my invention can be applied to the filter mats in any suitable manner, as for example by spraying the liquid into the mat. The ammonium salts of acid esters of polybasic oxyacids and polyhydroxy aliphatic compounds in addition to supplying the desired combustion-resistant dust collecting media and to preventing spontaneous combustion of collected dust, render flame-resistant the supporting structure when made from combustible material.

These dust filters can be regenerated simply by washing with water and reapplying the dust collecting liquid, and in this respect provide greater economy and convenience as compared with dust filters impregnated with oil.

A suitable composition is prepared as follows, the parts being by weight:

To 3000 parts dynamite grade glycerol, heated by external steam 3000 parts recrystallized sulfamic acid is added portionwise with stirring during a two-hour interval, while controlling the temperature with slight cooling at 110–120° C. The reaction is continued until all of the sulfamic acid dissolves and a constant low acid number is obtained. There are then added 20 parts of a mixture containing approximately 50% sodium sulfate of commercial coconut oil alcohols, the remainder being essentially sodium sulfate and sodium chloride and known commercially as "Aquarex D" (wetting agent), and 0.2 part phenyl mercuric hydroxide (fungicide), and the mixture is heated at 90–122° C. for an additional four hours. The final solution is neutralized by the addition of 100 parts of 28% ammonium hydroxide solution and clarified by passing through a filter while hot. This composition has at 25° C. a Gardner-Holdt bubble tube viscosity of about Z–5.

This composition is non-inflammable, free of odor, non-corrosive to steel, substantially non-volatile, chemically stable, hygroscopic, and has surface tension characteristics similar to lubricating oils, and also good wetting action. It does not smoke or fume when placed in a flame or subjected to high temperatures.

The viscosity of the composition can be readily adjusted as desired simply by diluting it with water. It is desirable that the viscosity be relatively high, preferably between 20 poises and 80 poises at 25° C., although higher and lower viscosities may be used in some cases. A composition having suitable viscosity characteristics is obtained by diluting the composition described above with 20 per cent by weight of water.

In place of phenyl mercury hydroxide I may use any fungicide capable of inhibiting growth of various micro-organisms whether bacteria, mold or fungi, but highly active non-volatile substances such as the phenyl mercury compounds are preferred. Other but less suitable materials include salicylanilide, sodium pentachlorophenolate, paranitrophenol and other nitro phenols, and the cupric derivative of propionyl acetone and salicylaldehyde.

In place of "Aquarex D" I may use any suitable wetting agent, e. g., any wetting agent which will reduce the interfacial tension between dust and an aqueous solution. These include anion active wetting agents, for example, the alkali metal salts of long chain alkyl sulfuric acids, the alkali metal salts of long chain substituted aromatic sulfonic acids, fatty acid soaps and the like. They also include cation active wetting agents, for example, long chain quaternary ammonium salts, betaines containing a long chain alkyl group and the like.

While I have illustrated my invention with particular reference to glyceryl ammonium sulfate which exemplifies all the desirable attributes of my invention, it will be understood that my invention is in its broader aspects not limited thereto but that other ester-salts having similar characteristics may also be employed.

Thus my invention in its broader aspects is directed to fluid salts of acid esters of polybasic inorganic oxyacids and polyhydroxy aliphatic compounds including those which readily become liquid in the presence of plasticizer or solvent. Suitable polybasic inorganic oxyacids include acids such as boric, phosphoric and sulfuric acids. These may be esterified by any of the well-known methods of esterification. For example, borates can be prepared by reaction with boric acid; phosphates are prepared by reaction with phosphoric acid, phosphorous pentoxide, phosphorous oxychloride, or ammonium acid phosphate, and sulfates are obtained by reaction with sulfuric acid, ammonium acid sulfate, chlorosulfonic acid, or sulfamic acid. The ammonium sulfate esters are of particular interest since they can be prepared with high yield and free of by-products from sulfamic acid.

Suitable polyhydroxy aliphatic compounds include hydroxy acids such as glycollic, lactic, citric, tartaric, glyceric, hydroxybutyric, malic acids and their polyhydroxy derivatives; glycols such as ethylene, propylene and butylene glycols; and higher alcohols such as glycerin, pentaerythritol, sorbitol, mannitol, and polyalcohols obtained by the hydrogenation, or reduction by other means, of the triose, tetrose, pentose and hexose sugars. The carbon chains in these compounds can be straight or branched chains and they can be saturated or unsaturated. Other atoms than carbon atoms can be present in the chain, including oxygen or nitrogen. That is, the polyhydroxy compounds can be ethers such as polyetheylene glycol or polyglycerol, amines such as di- and tri-ethanolamine, or esters such as those from a hydroxy acid and an alcohol, from an unsubstituted straight or branched chain aliphatic acid and a glycol or higher polyhydric alcohol, or from a hydroxy acid and a glycol or higher polyhydric alcohol. The triose, tetrose, pentose and hexose sugars are also suitable for the preparation of the ester-salts. Preferably these compounds should not contain more than six carbon atoms.

One or more of the hydroxy groups may be esterified by the polybasic acid. Also, if a tribasic acid is used, di-esters are suitable. Three carbon atoms for each inorganic acid radical is most suitable.

The ester-salts may in some instances be used alone but preferably are used in compositions containing other materials adapted to preserve or modify the properties of the ester-salts. Thus I may include fungicides and wetting agents of the character described and plasticizer or solvents of which water is particularly suitable. Other materials such as the various polyhydroxy aliphatic compounds listed above may be used either alone or in combination with water to plasticize or modify the viscosity of the compositions. Similarly, viscosity or plasticity-building agents may be included in limited amounts where desired, including colloidal materials such as glue, gelatin, Irish moss, water-soluble methyl cellulose, starch acetate, gum Karaya, polyvinyl alcohol, and the like.

Although my dust collecting compositions are most often used on filter mats, pads or screens, their utility is not thus limited and may be used wherever dust-containing gases are caused to flow past, to impinge upon or to pass thru the composition or a surface covered with the composition.

I claim:

1. An air filter comprising a porous structure the pores of which contain glyceryl ammonium sulfate.

2. An air filter comprising a porous structure the pores of which contain an ammonium salt of an acid ester of a polybasic inorganic oxyacid and a polyhydroxy aliphatic compound.

3. An air filter comprising a porous structure the pores of which contain a water-soluble salt of an acid ester of a polybasic inorganic oxyacid and a polyhydroxy aliphatic compound.

4. An air filter comprising a porous structure the pores of which contain a water-soluble ester-salt of a polyhydroxy aliphatic compound the salt portion of which is a fireproofing salt selected from the class consisting of ammonium borate, ammonium phosphate and ammonium sulfate.

5. An air filter comprising a porous structure the pores of which contain an ammonium salt of an acid ester of a polybasic inorganic oxyacid and a polyhydroxy aliphatic compound containing less than seven carbon atoms in which the organic portion of the ester has three carbons for each inorganic radical.

6. An air filter comprising a porous structure the pores of which are initially impregnated with a water-soluble substantially non-volatile liquid having a viscosity between 20 poises and 80 poises at 25° C. selected from the class consisting of ammonium salts of acid esters of polybasic inorganic oxyacids and polyhydroxy aliphatic compounds and aqueous solutions thereof.

7. An air filter comprising a porous structure the pores of which are initially impregnated with a water-soluble substantially non-volatile liquid consisting essentially of glyceryl ammonium sulfate, a wetting agent, a fungicide, and water in proportions such that the liquid has a viscosity between about 20 poises and 80 poises at 25° C.

MARTIN ELI CUPERY.